Figure 1:
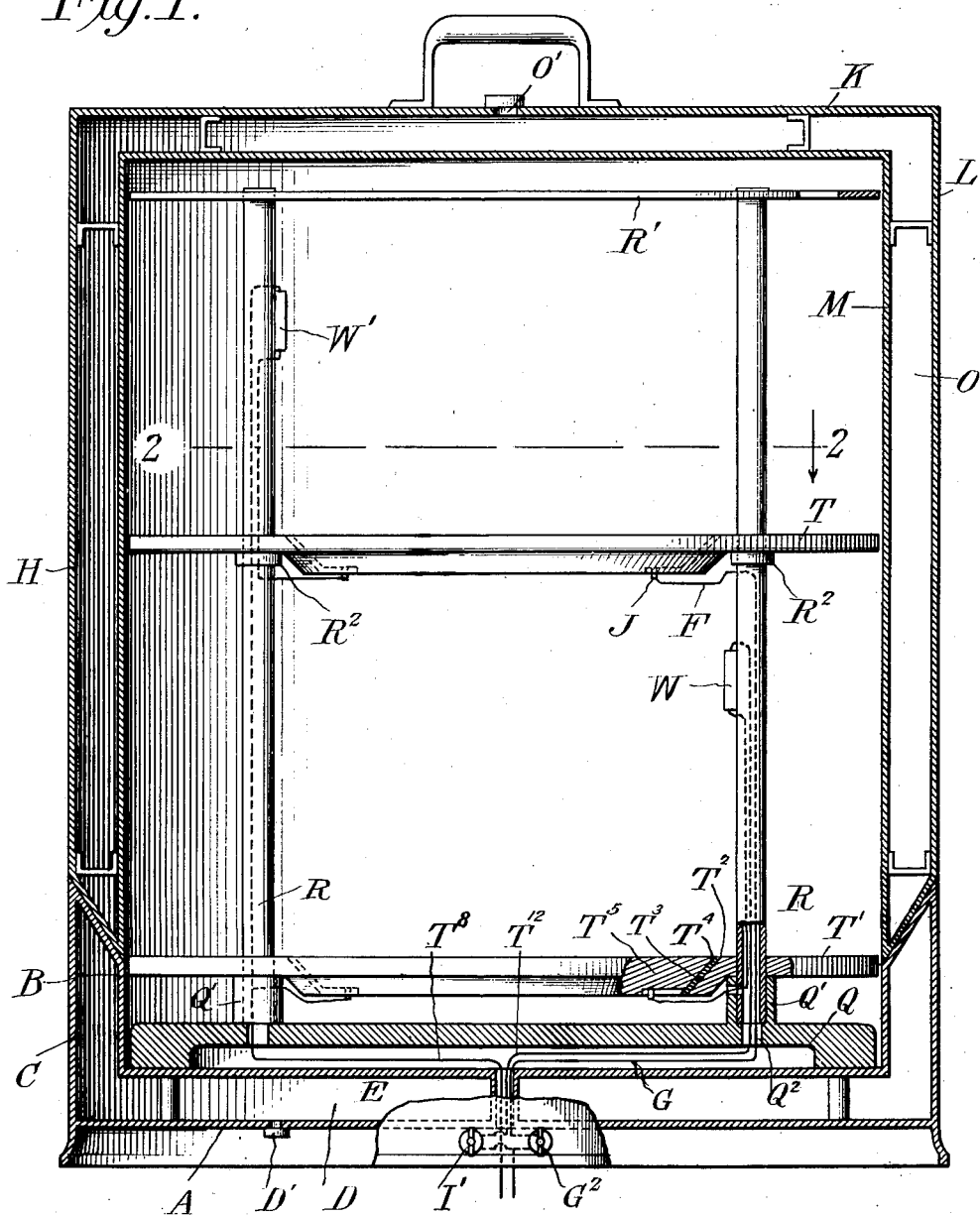

R. B. VESSEY.
COOKING APPARATUS.
APPLICATION FILED SEPT. 26, 1911.

1,026,334.

Patented May 14, 1912.

2 SHEETS—SHEET 1.

WITNESSES

INVENTOR
Ralph B. Vessey
Attorney

UNITED STATES PATENT OFFICE.

RALPH B. VESSEY, OF FLINT, MICHIGAN.

COOKING APPARATUS.

1,026,334.          Specification of Letters Patent.          Patented May 14, 1912.

Application filed September 26, 1911. Serial No. 651,430.

*To all whom it may concern:*

Be it known that I, RALPH B. VESSEY, a citizen of the United States, residing at Flint, in the county of Genesee and State of Michigan, have invented certain new and useful Improvements in Cooking Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cooking apparatus in which the heat is generated by electricity, the walls of the cooker being preferably double and provided with vacuum space to prevent the radiation of heat and retaining the same within the apparatus.

The invention comprises various details of construction and combinations and arrangements of parts which will be hereinafter fully described, shown in the drawings and then specifically defined in the appended claims.

I illustrate my invention in the accompanying drawings, in which:—

Figure 2:
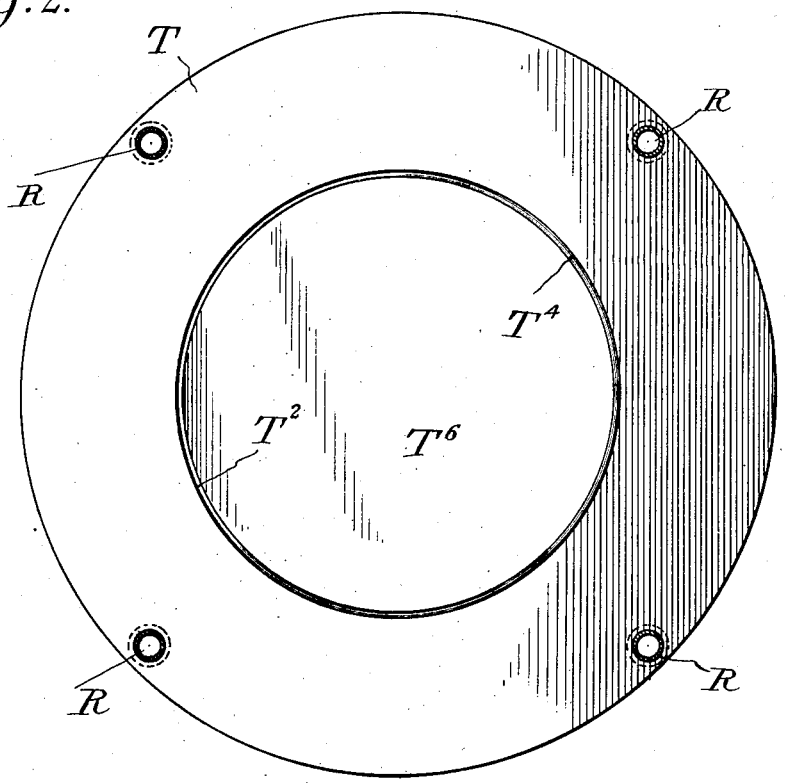
Figure 3:
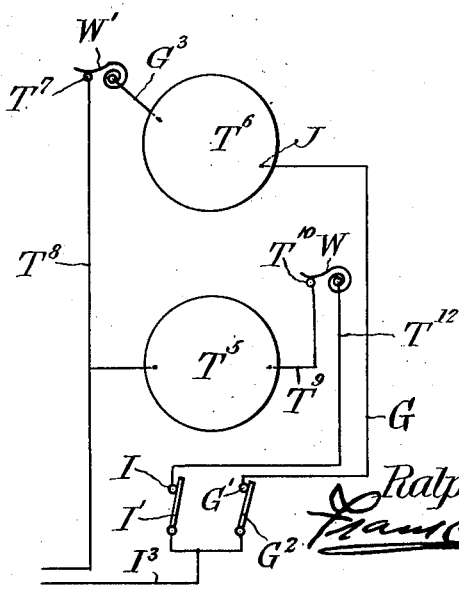

Figure 1 is a vertical central sectional view through the apparatus. Fig. 2 is a sectional view taken on line 2—2 of Fig. 1 and looking in the direction of the arrow, and Fig. 3 is a diagrammatic view of the circuit and thermostats.

Reference now being had to the details of the drawings by letter, A designates the base of the apparatus which is provided with two walls B and C, separated from each other and forming a vacuum space D, having a sealed opening D' at the bottom thereof. An open-ended tube E passes through the two walls adjacent to the center thereof and through which the electric conductor wires G, T$^8$ and T$^{12}$ pass. The upper portion of the apparatus, designated by letter H, has two walls L and M spaced apart, forming a vacuum space O, having a sealed opening O' at the top thereof. The upper portion of the wall B, as shown clearly in Fig. 1 of the drawings, is beveled and the lower portion of the upper receptacle is also beveled and is adapted to contact with the beveled portion of the wall B, thereby making a tight fit.

Mounted within the lower receptacle and resting upon the bottom thereof is a plate Q having hollow bosses Q' rising therefrom with openings Q$^2$ in the bottom thereof and tubular standards R telescope one within each of said bosses and their upper ends are fastened to a disk or plate R'. Collars R$^2$ are fastened to the standards and afford means for supporting the disk T, while a similar disk T' rests upon the tops of the bosses Q'. Each of said disks T and T' is provided with a central opening T$^2$, one of which is shown clearly in Fig. 2 of the drawings, and the marginal edge of the opening is beveled as at T$^3$ and upon said beveled surface is an insulating material T$^4$, shown clearly in the section Fig. 1.

T$^5$ designates a heater which rests upon the insulation and is supported as shown clearly in the drawings.

Thermostats, designated by letters W and W', are placed one below the disk T and the other above, and the electric wire G communicates with a terminal G' against which a switch G$^2$ is adapted to contact to put the wire in circuit, said wire being connected with the terminal J upon the heater T$^6$ supported by the upper disk. A wire G$^3$ connects the upper heater with the thermostat W', said thermostat being normally in contact with a terminal T$^7$ to which is connected the wire T$^8$ to complete the circuit. The lower heater T$^5$ is electrically connected by means of the wire T$^9$ with a terminal T$^{10}$ against which the thermostat W normally contacts and which in turn is electrically connected by means of the wire T$^{12}$ with the terminal I against which the switch I' contacts. Leading from the two switches G$^2$ and I' is a wire I$^3$.

The operation of my invention will be readily understood and is as follows:—The air being exhausted from the space between the walls of the two compartments, a vacuum is formed, preventing the radiation of any heat which may be generated. For instance, by throwing the switch G$^2$ in contact with the terminal G', a current of electricity will pass through the upper heater T$^6$ through the connections therewith, the thermostat W' and return wire T$^8$. In the event of the heat generated rising to a certain temperature, the thermostat W' will act and the connection intermediate the same and the terminal T$^7$ will be broken, thus shutting off the heat from the upper heater.

In the event of the heat in the lower heater rising to a certain temperature, the thermostat W will break connection with the terminal $T^{10}$ and cut off the heat from the lower heater. If both switches are turned on at the same time and one of the thermostats actuated to cut off one heater, the other will continue until the temperature rises to such a degree as will cause the particular thermostat in this circuit to break connection.

From the foregoing, it will be noted, that, by the provision of an apparatus as shown and described, a simple and efficient cooker is afforded to which heat is supplied by electricity and retained by the vacuum formed about the sections being prevented from radiation, thus maintaining the heat within the compartments for a considerable length of time after the currents of electricity have been automatically cut off.

What I claim to be new is:—

1. Cooking apparatus comprising a base and a superimposed structure resting thereon and each having double walls spaced apart and forming vacuum spaces, a plate supported upon the bottom section and tubular standards rising therefrom, a disk supported upon said standards, heaters, one supported by each disk and insulated therefrom, thermostats within the upper superimposed section, and electric wires connected to the heaters and thermostats, as set forth.

2. Cooking apparatus comprising a base and a superimposed structure resting thereon and each having double walls spaced apart and forming vacuum spaces, a plate supported upon the bottom section and having hollow bosses rising about apertures formed in said plate, tubes telescoping within said bosses, collars upon the tubing, disks supported by the collars, a heater supported by each disk and insulated therefrom, thermostats and electric connections intermediate the same and the heaters, and switches in the circuit, as set forth.

In testimony whereof I hereunto affix my signature in the presence of two witnesses.

RALPH B. VESSEY.

Witnesses:
 E. L. SANFORD,
 W. E. McINNES.